July 11, 1972  D. R. GRADY  3,676,076
DISPOSABLE CONTAINER

Filed Sept. 24, 1970  2 Sheets-Sheet 1

INVENTOR.
DENNIS R. GRADY
BY
Eliot S. Gerber
ATTORNEY

July 11, 1972   D. R. GRADY   3,676,076
DISPOSABLE CONTAINER
Filed Sept. 24, 1970   2 Sheets-Sheet 2
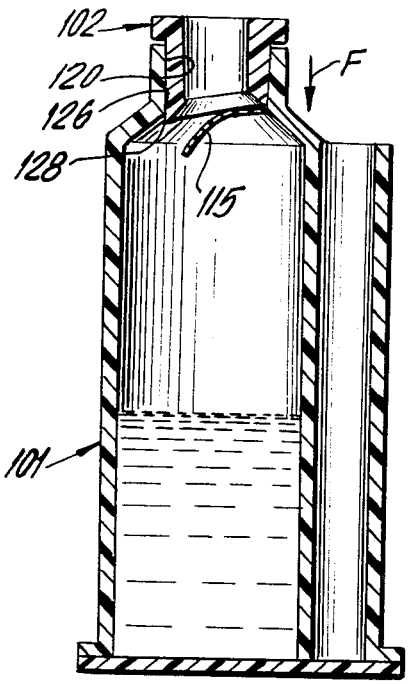
FIG. 4
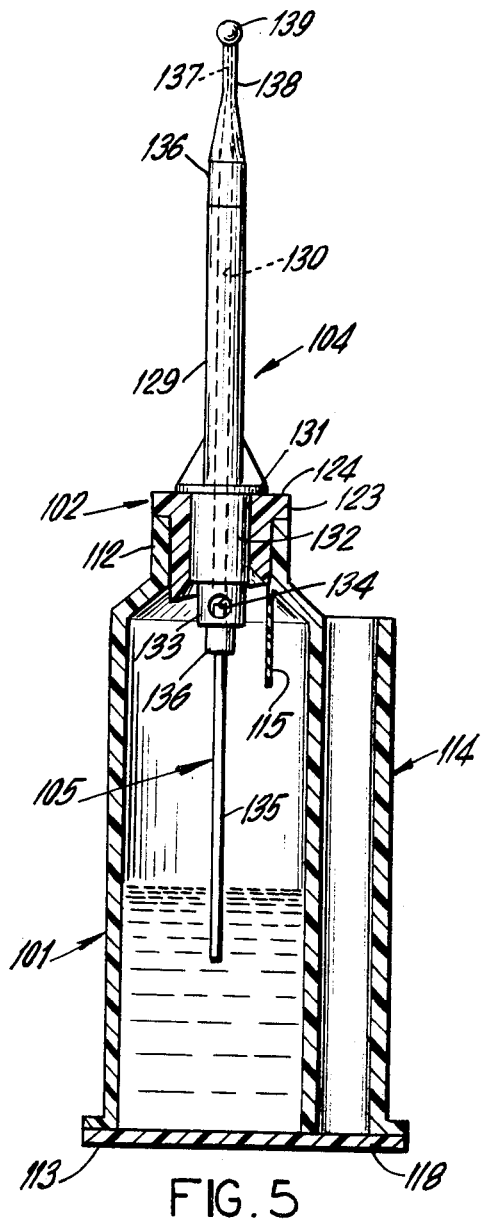
FIG. 5
FIG. 6
INVENTOR.
DENNIS R. GRADY
BY
Eliot S. Gerber
ATTORNEY

# United States Patent Office 3,676,076
Patented July 11, 1972

3,676,076
DISPOSABLE CONTAINER
Dennis R. Grady, Yonkers, N.Y., assignor to Gradko Glass Laboratories, Inc., Yonkers, N.Y.
Filed Sept. 24, 1970, Ser. No. 74,959
Int. Cl. B01l *3/00;* B65d *1/04;* G01n *1/14*
U.S. Cl. 23—292                                    6 Claims

ABSTRACT OF THE DISCLOSURE

A disposable container, particularly for use in laboratory and medical uses, includes a plastic resin container having flexible walls. A neck portion of the container has an opening which is closed by a thin membrane, the membrane being adapted to be pierced by a bushing lodged, with a friction fit, in the neck. The bushing has a pointed edge directed toward the membrane and an outwardly extending flange portion, which controls the movement of the bushing.

BACKGROUND OF THE INVENTION

At the present time there are many situations when an exact amount of a liquid or solid is needed, particularly in laboratory and medical analysis. For example, in the preparation of blood samples it is necessary to dilute an exact measure of the patient's blood with an equally, but much larger, quantity of diluent. Often a liquid is mixed and then measured, by hand apparatus, and the small measured amounts placed in test tubes or other glassware. This procedure has numerous defects, namely, it is time consuming; it depends upon the knowledge, care and skill of the technician preparing the measured amounts to mix the solution properly and to measure out the exact desired amounts; it relies upon the materials which happen to be in the laboratory for the freshness and purity of the substances from which the liquid is prepared; and, even if the test tubes are corked it exposes the contents to contamination and evaporation. It has also been suggested that an exact amount of liquid may be placed in a capillary tube and the ends of the tube sealed. That suggestion, however, limits the quantity of liquid to a very small amount and will not work with solids. It has also been known to fill small plastic resin containers with a predetermined quantity of liquid or solid and to close the container with a plastic film which is punctured by any handy object, such as a thick needle. However, opening of that type of container requires two hands, one to hold the container and the other to hold the needle. In addition, the needle may enter the contents and contaminate or remove some of it and the opening formed may be jagged.

SUMMARY OF THE INVENTION

A container is provided which has therein a predetermined and exactly measured amount of a solid, gas or liquid. The container is sealed by a thin membrane which is designed to be punctured by a pointed bushing frictionally lodged in the neck of the container above the membrane. Downward pressure on a flange of the bushing pushes it down the neck, thereby puncturing the membrane, until the bottom face of the flange meets the lip of the neck portion of the container. A film over the top of the flange protects the bushing, and the contents, from contamination.

The bore of the bushing provides the orifice for the container. When used with a dilution system a holder having a capillary pipette may be positioned in the bore with the pipette within the container. Preferably, both the neck portion and the bushing bore are cylindrical and tapered to provide liquid-tight and air-tight seals. Preferably the holder has a bore therethrough which may be temporarily sealed by a removable cap to permit mixture of the diluent with the contents of the pipette. After such dilution the cap is removed, or its end broken off, and the flexible sides of the container are squeezed, so that the diluted liquid exits through the bore of the holder. It is particularly useful to have a container holding a predetermined amount of liquid which may be opened by using only one hand when performing a dilution. The free hand may be used to grasp a capillary pipette, for example, to obtain a blood sample.

It is an objective of the present invention to provide a container for a predetermined quantity of material which: (1) may be opened using only one hand; (2) protects the contents from contamination; (3) is an exact measure of the desired quantity; (4) may be opened without using a foreign implement which may contaminate the contents; (5) provides a sealing bore for the insertion of a pipette carrying holder; and (6) may be manufactured from only a few relatively low cost plastic resin parts, which are adapted to be automatically injection-molded and assembled.

BRIEF DESCRIPTION OF THE DRAWINGS

The drawings, which accompany the present application, illustrate the preferred embodiment which gives the inventor's best mode of practicing the invention. In those drawings:

FIG. 4 is a side cross-sectional view similar to FIG. 3, i.e., of the embodiment of FIG. 1, but with the membrane being further separated;

FIG. 5 is a cross-sectional view of the container and bushing of the embodiment of FIG. 1 but a side plan view of the pipette and its holder; and FIG. 6 is an enlarged perspective view of the bushing.

Figure 1:
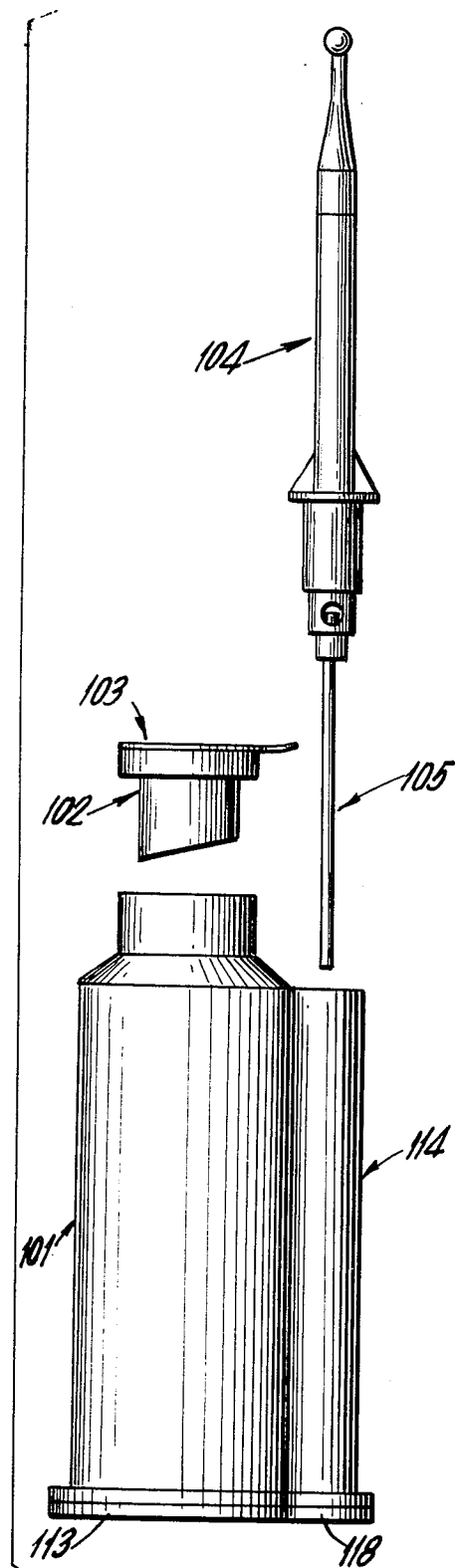
FIG. 1 is a side plan exploded view of an alternative embodiment of a container, bushing and pipeette holder.

The preferred embodiment, shown in the drawings, consists generally of a container 101, a bushing 102, a cover 103 and a holding member 104 having a capillary pipette 105. All of the parts, except for the pipette 105, are formed by injection-molding of a suitable plastic resin.

The container 101 consists of a cylindrical body portion 110, an upper shoulder portion 111, a tubular neck portion 112, a flat bottom portion 113, a scabbard 114 and a sealing membrane 115. The container, typically, has a capacity of up to 10 ml. All of the container portions, except the bottom portion, are formed as an integral unit by injection molding. The membrane must be sufficiently thin, preferably of 0.010 inch, to permit its piercing. The membrane, even when it is thin, is sufficiently strong to enable it to seal the container. Suitable plastic resins for the container, including bottom portion 113, are the flexible plastics such as polyethylene or polypropylene. The container 101 is inverted (upside down relative to FIG. 1) and filled with an accurately measured quantity of some material, for example, a diluent liquid. The bottom plate 113 is then positioned on the body rim 116 and cover plate joined by ultrasonic welding. Alternatively, the two pieces may be joined by adhesive or other means. The sealing provides a hermetically sealed unit.

The scabbard 114 consists of a tubular portion 117 which is integral with the body 110. It protects the pipette 105 during shipment and storage. The bottom of the tubular portion 117 is closed by an extension portion 118 of the flat bottom portion 113.

The tubular neck portion 112 has an upper lip 119 and a cylindrical inner wall 120. The inner wall 120 is tapered at 3°–4°, so that its inner diameter is less at the bottom (in the direction of arrow F) than at its top. The unsealing membrane 115 is a disk whose edges are sealed and integral with the body portion 110 at the bottom of the opening through the tubular neck portion 112.

The bushing 102, as more particularly shown in FIG. 6, consists of a tubular portion 121 having an outer wall 121a and an inner wall 122 forming a cylindrical bore. The outer wall 121 is straight-sided. However, the inner wall 122 is tapered inwardly at 3°–4° so that the diameter at its bottom (in the direction of arrow F) is slightly smaller than the diameter of its bore at the top of the bushing. The lower edge of the bushing 102 is canted to form a sharp leading edge 128 which is adapted to pierce the membrane. The entire bottom outside perimeter of the bushing wall 121 is a cutting edge which has an initial contact with the neck membrane in only a small arc of the perimeter. The bushing 102 has an outwardly extending flange (shoulder) 123 having a flat upper face 124 and a flat bottom face 125. The bushing is of a rigid plastic resin, preferably polystyrene.

Figure 2:
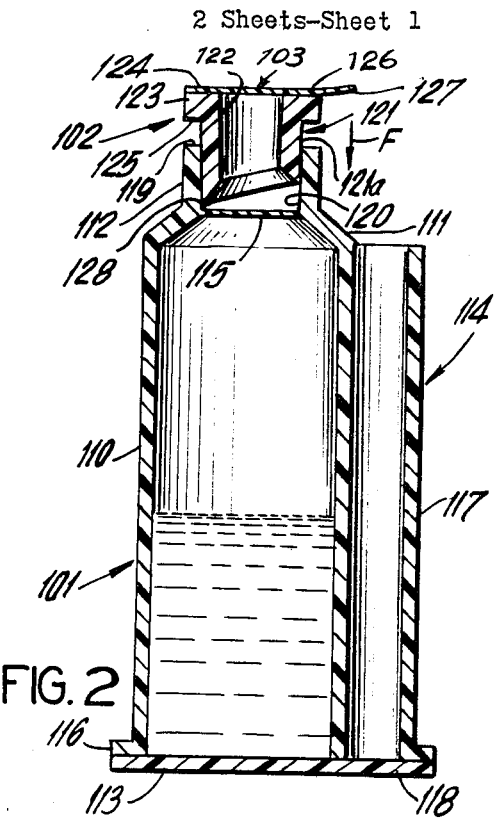
FIG. 2 is a side cross-sectional view of the sealed container and bushing of FIG. 1.

The upper face 124 of bushing 102 has attached to it a covering film 126 with a tab 127 which extends beyond the edge of the flange 123 (see FIG. 2). The film 126 is of a suitable plastic resin, for example, polyethylene or nylon. The cover film is preferably not welded to the bushing but rather is fixed to the top of the face 124 by means of a removable adhesive, so that the film 126 may readily be pried off by upward pressure on its tab 127. The film may alternatively be formed by spraying polyethylene or paper onto the top of the flange 124, in which case a tab would not be formed. However, in some instances a tab is not necessary, for example, the thin film may readily be pierced by a pipette or it may be burst when the container is squeezed.

As shown in FIG. 5, the holding member 104 consists of an elongated tubular portion 129 having therethrough a bore 130. The elongated portion 129 has a flange 131 which is adapted to rest on the top face 124 of the bushing. A further tubular portion 132 of the holding member is cylindrical and has a straight exterior wall, so that it forms an air-tight and liquid-tight seal with the inner wall 122 of the bore of the bushing. A tubular portion 133 of a smaller diameter has a hole 134 therethrough to permit the viewing of the end of the glass capillary pipette 135.

The capillary pipette 135 is held within the tubular portion 136 of the holding member 104. A removable cap 136 is secured to the top of the elongated portion 129, the bore 130 continuing within the cap 136. However, near its upper end the bore 137 becomes very narrow and the cap itself, at its end portion 138, is of smaller diameter and is sealed by a ball-like drop 139. For example, the end portion 138 may have an outer diameter of .004 inch and an inner diameter of .002 inch.

Figure 3:
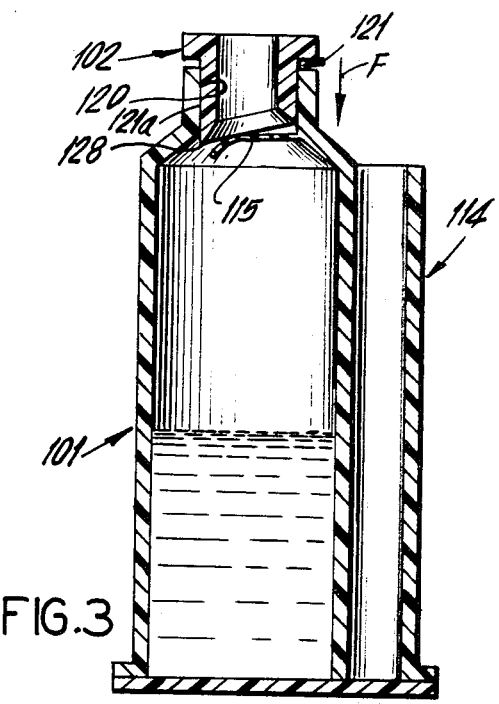
FIG. 3 is a side cross-sectional view, similar to FIG. 2, i.e., of the embodiment of FIG. 1, but with the bushing starting to puncture the membrane of the container.

In operation, as shown in FIG. 2, the bushing 102 is held lodged above the membrane 115 by means of its frictional fit within the neck portion 112. The fit is sufficiently close so that slight accidental pressure will not dislodge it from its position and will not rupture the membrane. When it is desired that the material within the container be used, for example, to provide a single dose of a medicine, the operator holds the container in one hand and with the thumb, or other finger, pushes downwardly on the upper face 124 of the flange of the bushing. This downward pressure, in the direction of arrow F of FIG. 2, causes the bushing to move downward within the neck and causes its point 128 to puncture the membrane 115. The point 128 punctures the membrane in the form of an arc, the initial puncture being shown in FIG. 3. Further pressure on the bushing, as shown in FIG. 4, causes the membrane to be sheared from the body portion 110 of the container in a continuous and smooth action. The dimensions are chosen so that, as shown in FIG. 5, the membrane 115 is not severed but rather remains attached at the body portion along a small portion of its edge and hangs down into the container. The unseparated portion is at the base of the neck, permitting a clear and complete flow of liquid from the container. If the contents of the container are emptied, the film 126 must be removed either by a tab or by applying pressure to the container. For example, if the film is sufficiently thin and does not have a tab, the container is inverted with its mouth downward and its flexible walls are squeezed. This causes fluid to burst the film 126 and to exit from the container.

If the container is part of the diluent system, as shown in FIG. 5, then the opening steps are the same as set forth above, that is, the bushing is pushed down to sever the membrane. The holding member 104 is then inserted with its portion 132 sealing against the inner wall of the bushing. Previously a sample has been, by capillary action, taken within the capillary tube 135. The cap and dispenser are retained on the holding member and the entire container and holding member together are shaken, permitting the diluent fluid to flush out the material within the capillary pipette 135, providing a diluted solution. The small ball 139 is then broken off, opening up the small bore 137. The container is then squeezed, permitting small drops of diluted liquid to be forced from the container. Alternatively, the cap may be removed and the container squeezed, providing a larger stream of liquid.

I claim:

1. A container assembly comprising a container adapted to contain a measured quantity of material,
   said container having a neck portion forming a bore orifice for said container and forming a shoulder about said orifice, a thin rupturable membrane covering said orifice and sealing said container,
   a bushing slidably positioned in said orifice above said membrane, said bushing having a downwardly descending edge portion adapted to pierce said membrane, said bushing having a bore and an outwardly extending flange portion, said flange portion being positioned above said shoulder before said membrane is pierced, said flange portion acting as a stop against said shoulder after the piercing of said membrane,
   a scabbard holder integral with said container, a capillary tube assembly removably positioned in said scabbard holder, said capillary tube assembly comprising a capillary tube of predetermined length and internal diameter and a capillary tube holder having means to grip said capillary tube, said capillary tube holder having a neck portion which sealingly fits within said bore orifice of said container.

2. A container assembly as in claim 1 wherein said bushing flange portion has an upper face, said container assembly further including a film removably adhered to the buhing at the upper face of said flange portion and covering the bore of said bushing.

3. A container assembly as in claim 1 wherein said container bore orifice is cylindrical and tapered and said bushing is lodged in said neck only by friction.

4. A container assembly as in claim 1 wherein said scabbard is tubular and has a closed bottom and an open top.

5. A container assembly as in claim 1 wherein the container has therein a measured amount of diluent, the capillary tube holder has an inspection port within which an end of the capillary tube protrudes and terminates and said capillary tube holder has a bore extending from the port to an outer end of the holder to permit the diluted liquid to be squeezed out from the container.

6. A container assembly as in claim 5 and also including a removable cap sealing the bore of said capillary tube holder, said cap sealing the bore at its outer end.

References Cited
UNITED STATES PATENTS

| | | | |
|---|---|---|---|
| 2,744,649 | 5/1956 | Smith | 215—6 XR |
| 2,911,123 | 11/1959 | Saccomanno | 215—6 XR |
| 3,344,914 | 10/1967 | Bloom et al. | 215—6 XR |

MORRIS O. WOLK, Primary Examiner

R. M. REESE, Assistant Examiner

U.S. Cl. X.R.

23—259; 73—425.4 R; 206—47 A; 215—6